(12) United States Patent
Fujita et al.

(10) Patent No.: US 7,789,786 B2
(45) Date of Patent: Sep. 7, 2010

(54) DIFFERENTIAL DEVICE

(75) Inventors: Hirofumi Fujita, Okazaki (JP);
Kazuyuki Watanabe, Anjyo (JP);
Takuya Ito, Kasugai (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 325 days.

(21) Appl. No.: 12/029,886

(22) Filed: Feb. 12, 2008

(65) Prior Publication Data

US 2008/0196975 A1    Aug. 21, 2008

(30) Foreign Application Priority Data

Feb. 16, 2007    (JP) ............... 2007-035882

(51) Int. Cl.
*F16H 57/04*    (2010.01)
(52) U.S. Cl. ..................................... 475/160
(58) Field of Classification Search ................. 475/160; 74/467
See application file for complete search history.

(56) References Cited

U.S. PATENT DOCUMENTS

| | | | | |
|---|---|---|---|---|
| 1,874,646 A | * | 8/1932 | Skinner ................ | 184/13.1 |
| 3,738,452 A | * | 6/1973 | Hausinger ............ | 184/6.12 |
| 4,294,218 A | * | 10/1981 | King et al. ............ | 123/502 |
| 4,667,774 A | * | 5/1987 | Roberge .............. | 184/6.12 |
| 6,027,423 A | * | 2/2000 | Bell .................... | 475/246 |
| 7,445,088 B2 | * | 11/2008 | Watanabe et al. ..... | 184/13.1 |
| 2005/0049101 A1 | * | 3/2005 | Kumashi et al. ...... | 475/160 |

FOREIGN PATENT DOCUMENTS

| | | |
|---|---|---|
| JP | 55-092955 U | 6/1980 |
| JP | 59-208267 A | 11/1984 |
| JP | 03-108955 U | 11/1991 |
| JP | 4236851 A | 8/1992 |
| JP | 4-126055 A | 11/1992 |
| JP | 63-069851 A | 5/1998 |
| JP | 2003207022 A | 7/2003 |
| JP | 200490181 A | 3/2004 |
| JP | 2004286041 A | 10/2004 |

* cited by examiner

*Primary Examiner*—Dirk Wright
(74) *Attorney, Agent, or Firm*—Sughrue Mion, PLLC (57) ABSTRACT

An embodiment of a differential device of the present invention comprises a pair of side gears and a pair of pinion gears housed inside a differential case, with the pinion gears supported by a pinion shaft fixed to the differential case at axial end sections thereof so as to be capable of sliding freely thereabout. Lubricating oil channels are provided that pass through each of the end sections of the pinion shaft in the axial direction thereof. One end of each lubricating oil channel opens to the exterior of the differential case at a shaft-end corner section of the pinion shaft corresponding to an upstream side thereof in a direction of rotation of the differential case, and another end opens to a sliding surface of the pinion shaft with respect to one of the pinion gears. The differential device also comprises a mechanism for providing lubricating oil to the lubricating oil channels upon rotation of the differential case.

6 Claims, 4 Drawing Sheets

DIFFERENTIAL DEVICE

BACKGROUND OF THE INVENTION

This application seeks priority based on Patent Application No. 2007-35882, which was filed in Japan on Feb. 16, 2007. Accordingly, all of the content thereof is included in this application.

The present invention relates to a differential device provided with a pair of side gears and a pair of pinion gears housed inside a differential case, and specifically, to a countermeasure for providing lubricating oil smoothly to sliding sections with a pinion shaft supporting each pinion gear so as to be capable of sliding freely.

In vehicles such as automobiles, a rotation difference occurs between left and right drive wheels upon cornering, and therefore, a differential device has conventionally been provided in order to compensate for this rotation difference. As presented in JP 2004-90181A, for example, such a differential device includes a differential case, and a pair of side gears and a pair of pinion gears are housed therein. Furthermore, a pair of openings is formed in the differential case in order to insert the side gears and the pinion gears, and the side gears and the pinion gears having been inserted via the openings are supported inside the differential case. In specific terms, after each side gear is inserted via an opening and disposed in a desired location inside the differential case, each of the pinion gears is inserted and engaged with each side gear, and in this condition, the pinion shaft is passed through each of the pinion gears and fixed to the differential case.

However, when a rotation difference occurs between the left and right drive wheels upon cornering, each of the pinion gears slide around the axis of the pinion shaft. In such a case, the sliding surfaces of the pinion shaft with respect to each of the pinion gears are lubricated by lubricating oil having been stirred up by a final ring gear provided in the differential case. However, as the sliding surfaces of the pinion shaft with respect to each of the pinion gears are disposed inside the differential case, and in addition, the differential case itself is rotating, it is difficult to guide the lubricating oil having been stirred up by the final ring gear to the sliding surfaces of the pinion shaft with respect to each of the pinion gears, and the pinion gears slide thereupon in a substantially non-lubricated condition. For this reason, if a large rotation difference occurs between the left and right drive wheels, the sliding surfaces of the pinion shaft are liable to wear.

Accordingly, it is thought that a hollow channel can be formed inside a driveshaft, lubricating oil having been supplied from a casing housing the differential case can be guided to a central portion of an outer peripheral surface of the pinion shaft via the hollow channel in the driveshaft, and lubricating oil having been guided to the central portion of the outer peripheral surface of the pinion shaft can be fed to the sliding surfaces with respect to each of the pinion gears by a centrifugal force resulting from the rotation of the differential case.

However, in devices adopting the above approach, a strong sealing construction is required between a rotating body (that is, the driveshaft) and a fixed body (that is, the casing) upon guiding the lubricating oil from the casing to the hollow channel in the driveshaft, and the configuration thereof is extremely complicated.

SUMMARY OF THE INVENTION

The present invention has been devised in light of the above-described problem, and an object of the present invention is to provide a differential device capable of providing lubricating oil to sliding surfaces between the pinion shaft and each pinion gear thereof in a sure and reliable manner, with a simple configuration.

The solution provided by the present invention in order to accomplish the above-described object presupposes a differential device including a pair of side gears and a pair of pinion gears housed in a differential case, in which the pinion gears are supported on a pinion shaft fixed to the differential case at end sections thereof in an axial direction so as to be capable of sliding freely about the pinion shaft. Furthermore, lubricating oil channels are provided in the pinion shaft passing through an interior of each of the end sections thereof in an axial direction, one end of each of the lubricating oil channels opens to an exterior of the differential case at a shaft-end corner section of the pinion shaft corresponding to an upstream side thereof in a direction of rotation of the differential case, and another end thereof opens to a sliding surface of the pinion shaft with respect to one of the pinion gears. The differential device is also provided with a lubricating oil provision mechanism providing lubricating oil to the lubricating oil channels upon rotation of the differential case.

In this configuration, the lubricating oil provision mechanism may be configured such that lubricating oil is held within a bottom section of a casing housing the differential case, a lower section of the differential case is immersed in the lubricating oil, and upon rotation of the differential case, the lubricating oil at the bottom section of the casing is scooped up by the one end of each of the lubricating oil channels and introduced into the lubricating oil channels.

In accordance with this feature of the present invention, upon rotation of the differential case, having a lower section thereof immersed in lubricating oil held within the bottom section of the casing, the lubricating oil is scooped up by the one end of each of the lubricating oil channels opening to the exterior of the differential case at the shaft-end corner sections of the pinion shaft corresponding to the rotation-direction upstream side of the differential case and introduced into the lubricating oil channels, and is provided to the sliding surfaces of the pinion shaft with respect to the pinion gears via the other ends of the lubricating oil channels opening to the sliding surfaces with respect to the pinion gears. As a result of this, even though the sliding surfaces of the pinion shaft with respect to each of the pinion gears are disposed inside the rotating differential case, lubricating oil is smoothly provided to the sliding surfaces of the pinion shaft with respect to the pinion gears via the lubricating oil channels. Consequently, even when a large rotation difference occurs between the left and right drive wheels, the sliding surfaces of the pinion shaft with respect to the pinion gears are sufficiently lubricated by the lubricating oil provided to the sliding surfaces of the pinion shaft, and as a result, wearing of the sliding surfaces of the pinion shaft can be effectively prevented.

In addition, simply by providing lubricating oil channels passing through the interior of each of the end sections of the pinion shaft in the direction of the axis thereof, lubricating oil scooped up by the one end of each of the lubricating oil channels upon rotation of the differential case is smoothly provided to the sliding surfaces of the pinion shaft with respect to the pinion gears, and therefore, an extremely simple provision construction can be realized. Whereas a strong sealing construction is required upon the guiding lubricating oil from a casing to a hollow channel in the driveshaft in conventional differential devices, and the construction for provision of lubricating oil to the sliding surfaces of the pinion shaft becomes complicated, the same does not apply to the configuration according to the present invention.

Furthermore, as another solution provided by the present invention in order to accomplish the above-described object, the lubricating oil provision mechanism may be configured at a bottom section of the casing housing the differential case as a lubricating oil spraying means spraying lubricating oil towards the one end of each of the lubricating oil channels upon rotation of the differential case such that the lubricating oil sprayed by the lubricating oil spraying means is introduced into each of the lubricating oil channels via the one end thereof.

In accordance with this feature of the present invention, lubricating oil sprayed by the lubricating oil spraying means provided at the bottom of the casing is, upon rotation of the differential case, sprayed towards the end of each of the lubricating oil channels opening to the exterior of the differential case at the shaft-end corner sections of the pinion shaft corresponding to the rotation-direction upstream side of the differential case, and the sprayed lubricating oil is introduced into the end of each of the lubricating oil channels and provided to the sliding surfaces of the pinion shaft with respect to the pinion gears from the other end thereof. As a result of this, even though the sliding surfaces of the pinion shaft with respect to each of the pinion gears are disposed inside the rotating differential case, lubricating oil is smoothly provided to the sliding surfaces of the pinion shaft with respect to each of the pinion gears via the lubricating oil channels. Therefore, even when a large rotation difference occurs between the left and right drive wheels, the sliding surfaces of the pinion shaft with respect to each of the pinion gears are sufficiently lubricated by the lubricating oil provided to the sliding surfaces of the pinion shaft, and as a result, wearing of the sliding surfaces of the pinion shaft can be effectively prevented.

In addition, by simply providing the lubricating oil spraying means in addition to providing lubricating oil channels passing through the interior of each of the end sections of the pinion shaft in the direction of the axis thereof, the sliding surfaces of the pinion shaft can be sufficiently lubricated, and therefore, an extremely simple provision construction can be realized. Whereas a strong sealing construction is required upon the guiding lubricating oil from a casing to a hollow channel in the driveshaft in conventional differential devices, and the construction for provision of lubricating oil to the sliding surfaces of the pinion shaft becomes complicated, the same does not apply to the configuration according to the present invention.

Furthermore, even though the lower section of the differential case is not immersed in lubricating oil held within a bottom section of the casing, the lubricating oil sprayed by the lubricating oil spraying means can be sufficiently provided to the sliding surfaces of the pinion shaft with respect to the pinion gears by passing from the one end of the lubricating oil channels to the other end thereof, and therefore, this construction can be applied in any kind of differential device for provision of lubricating oil to the sliding surfaces of the pinion shaft, and the versatility of the provision construction for lubricating oil can be enhanced.

Furthermore, cut-away sections may be provided at portions of the differential case further upstream in the direction of rotation thereof than the pinion shaft and at the shaft-end corner sections of the pinion shaft corresponding to the rotation-direction upstream side positions of the differential case in order to expose the one end of each of the lubricating oil channels so as to face upstream in the direction of rotation of the differential case. As a result of this configuration, lubricating oil can be introduced easily and without impediment into the one end of the lubricating oil channels. Accordingly, when the one end of each of the lubricating oil channels moves down into the lubricating oil held within the bottom section of the casing upon rotation of the differential case, the lubricating oil can be guided smoothly and without impediment from the direction of rotation of the differential case and easily introduced via the end of the lubricating oil channel. Furthermore, lubricating oil sprayed from the lubricating oil spraying means can also be guided without impediment from a wide area and easily introduced via the one end of the lubricating oil channel. Accordingly, the introduction of the lubricating oil into each of the lubricating oil channels can be performed more smoothly due to the action of each of the cut-away sections, and this configuration is extremely beneficial in terms of the provision of the lubricating oil from the other end of each of the lubricating oil channels to the sliding surfaces of the pinion shaft with respect to the pinion gears.

DESCRIPTION OF THE PREFERRED EMBODIMENTS

The following is a description of preferred embodiments of the present invention, with reference to the accompanying drawings.

First Embodiment

Figure 1:
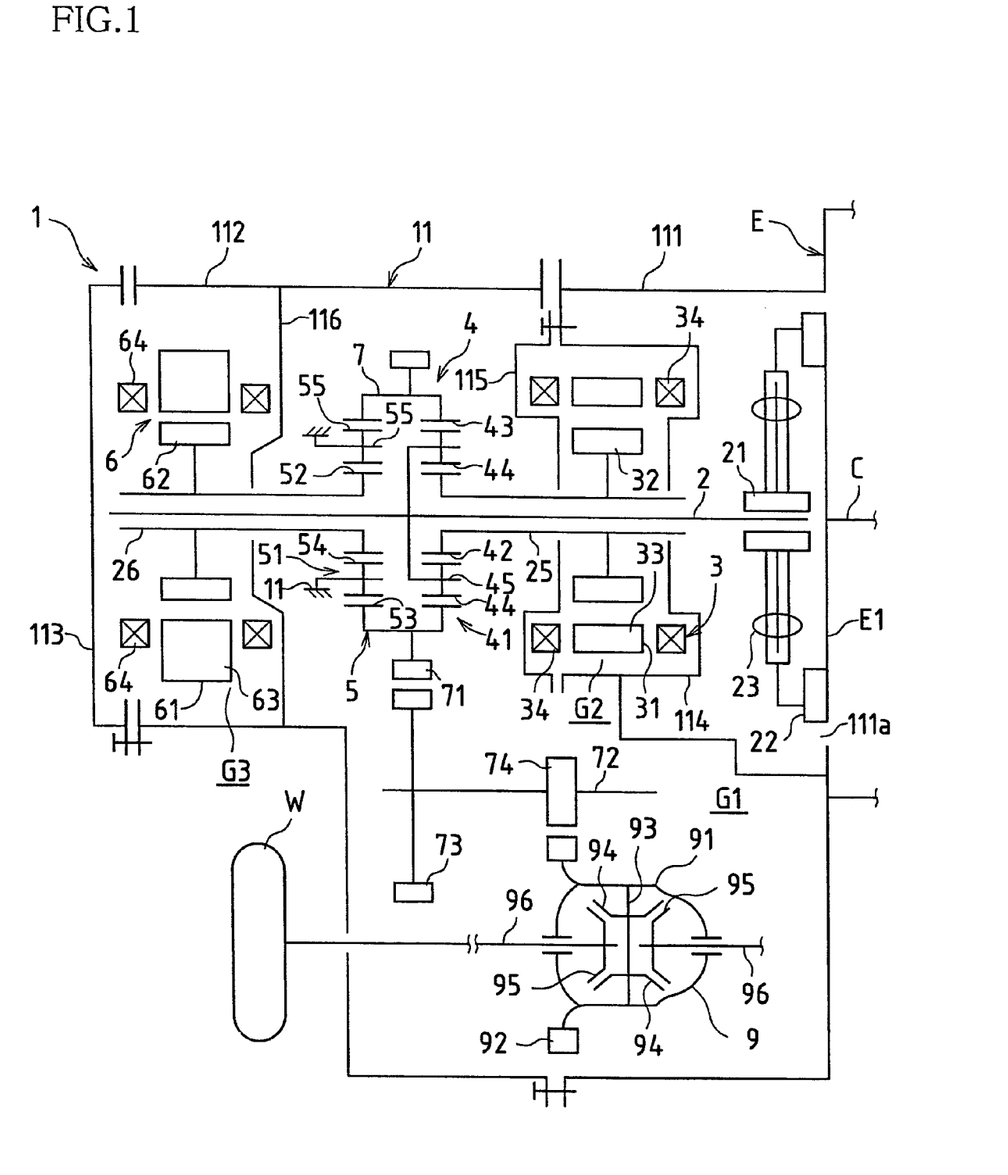
FIG. 1 is a skeleton view showing a transaxle of a hybrid vehicle provided with a differential device according to a first embodiment of the present invention.

FIG. 1 shows a skeleton view of a transaxle of a hybrid vehicle of an FF configuration (that is, front-engine, front-drive; front-wheel drive having the engine mounted at the front of the vehicle) provided with a differential device according to a first embodiment of the present invention.

As shown in FIG. 1, a transaxle 1 is configured as a gear train including three shafts (an input shaft 2, a countershaft 72, and a front driveshaft 96, as explained hereinafter). Furthermore, an engine E is disposed at a side of the transaxle 1 (a right side in FIG. 1), and the transaxle 1 is configured so as to receive a drive force from the engine E. An internal combustion engine, specifically, a gasoline engine, a diesel engine, an LPG engine, a methanol engine, or a hydrogen engine, etc. may be used as the engine E. In this embodiment, the present invention is explained in terms of usage of a gasoline engine as the engine E. The engine E is configured such that motive energy can be output from a crankshaft C through conversion of a reciprocating motion of a piston pursuant to the combustion of a mixture of a fuel and air in a combustion chamber into a rotating motion of the crankshaft C, and has a well-known construction including, for example, an intake device, an exhaust device, a fuel injection device, an ignition device, and a cooling device. The crankshaft C is disposed horizontally and in transverse direction of a vehicle, and a flywheel E1 is mounted to a tip of the crankshaft C.

A hollow transaxle case 11 is mounted on an outer wall of the engine E as a casing. The transaxle case 11 includes an engine-side housing 111, an extension housing 112, and an end cover 113. The engine-side housing 111, the extension housing 112, and the end cover 113 are formed from a metal material such as aluminum.

An open end 111a on one side of the engine-side housing 111 is fixed to the outer wall of the engine E by a means such as bolt fixing.

The extension housing 112 is disposed between the engine-side housing 111 and the end cover 113. That is to say, the transaxle case 11 is formed by mounting the extension housing 112 on the engine-side housing 111 and mounting the end cover 113 on the extension housing 112.

An input shaft 2, a first motor/generator 3, a power split mechanism 4, a transmission 5, and a second motor/generator 6 are provided in an inner section G1 of the transaxle case 11.

The input shaft 2 is disposed concentrically with the crankshaft C. A clutch hub 21 is spline fitted to an end section of the input shaft 2 closest to the crankshaft C. Between the flywheel E1 and the input shaft 2, a clutch 22 for controlling a condition of transmission of motive energy between both thereof and a damper mechanism 23 suppressing and absorbing changes in torque between both thereof are provided.

The first motor/generator 3 is disposed at an outer-periphery side of the input shaft 2, and the second motor/generator 6 is disposed at a position further from the engine E than the first motor/generator 3 (a left side in FIG. 1). That is to say, the first motor/generator 3 is disposed between the engine E and the second motor/generator 6.

The first motor/generator 3 and the second motor/generator 6 are provided both with functionality of a motor driven through the supply of electrical power (that is, a powering function) and functionality of a generator converting mechanical energy into electrical energy (that is, a regenerating function). For example, an alternating-current, synchronous type motor/generator can be used as the first motor/generator 3 and the second motor/generator 6. An electrical storage device such as a battery or a capacitor, or a well-known fuel cell, etc. may be used as a power supply device supplying electrical power to the first motor/generator 3 and the second motor/generator 6.

Hereinafter, a disposition position and configuration of the first motor/generator 3 are explained in detail. A partition 114 first extended towards the engine E and then extended towards the input shaft 2 is formed on an inner surface of the engine-side housing 111. Furthermore, a case cover 115 is fixed to the partition 114. The case cover 115 is formed so as to be first extended away from the engine E and then extended towards the input shaft 2. The first motor/generator 3 is housed in a space G2 enclosed by the partition 114 and the case cover 115.

The first motor/generator 3 includes a stator 31 fixed to the transaxle case 11 and a rotor 32 capable of rotating freely. The stator 31 is provided with a core 33 fixed to the partition 114 and a coil 34 wound about the magnet core 33.

The stator 31 and the rotor 32 include a plurality of magnetic steel plates of a prescribed thickness overlapped in a direction of thickness thereof. It should be noted that the plurality of magnetic steel plates are overlapped in an axial direction of the input shaft 2.

Meanwhile, a hollow shaft 25 is disposed at an outer periphery side of the input shaft 2. Furthermore, the input shaft 2 and the hollow shaft 25 are configured so as to be capable of relative rotation. The rotor 32 is connected to an outer periphery side of the hollow shaft 25.

Furthermore, the power split mechanism 4 is provided between the first motor/generator 3 and the second motor/generator 6. This power split mechanism 4 includes a planetary gear mechanism 41 of the so-called single pinion format. That is to say, the planetary gear mechanism 41 includes a sun gear 42, a ring gear 43 disposed concentrically with the sun gear 42, a plurality (4 in this embodiment) of pinion gears 44 engaging with the sun gear 42 and the ring gear 43, and a carrier 45 supporting the pinion gears 44 so as to be capable of rotating freely about an axis thereof and capable of revolving freely about a rotation center of the sun gear 42. The sun gear 42 and the hollow shaft 25 are connected, and the carrier 45 and the input shaft 2 are connected. It should be noted that the ring gear 43 is formed on an inner periphery side of an annular member (or cylindrical member) 7 disposed concentrically with the input shaft 2, and that a counter drive gear 71 is formed on an outer periphery side of the annular member 7.

Meanwhile, a hollow shaft 26 is provided so as to be capable of rotation at a rotation center section at the disposition positions of the transmission 5 and the second motor/generator 6, and the second motor/generator 6 is disposed on an outer periphery side of the hollow shaft 26. Hereinafter, a disposition position and configuration of the second motor/generator 6 are explained in detail. A partition 116 extended towards the input shaft 2 is formed on an inner surface of the extension housing 112. Furthermore, the second motor/generator 6 is housed in a space G3 enclosed by the extension housing 112, the partition 116, and the end cover 113.

The second motor/generator 6 includes a stator 61 fixed to the transaxle case 11 and a rotor 62 capable of rotating freely. The stator 61 is provided with a magnet core 63 and a coil 64 wound about the magnet core 63.

The stator 61 and the rotor 62 include a plurality of magnetic steel plates of a prescribed thickness overlapped in a direction of thickness thereof. It should be noted that the plurality of magnetic steel plates are overlapped in an axial direction of the input shaft 2. It should also be noted that the rotor 62 is connected to an outer periphery side of the hollow shaft 26.

The transmission 5 includes a planetary gear mechanism 51 of the so-called single pinion format disposed between the power split mechanism 4 and the second motor/generator 6 in an axial direction of the input shaft 2. That is to say, the planetary gear mechanism 51 includes a sun gear 52, a ring gear 53 disposed concentrically with the sun gear 52 and formed on an inner periphery of the annular member 7, a plurality (5 in this embodiment) of pinion gears 54 engaging with the sun gear 52 and the ring gear 53, and a carrier 55 supporting the pinion gears 54 so as to be capable of rotating freely about an axis thereof and capable of revolving freely about a rotation center of the sun gear 52. The carrier 55 is fixed on the transaxle case 11 side.

In this way, the first motor/generator 3, the power split mechanism 4, the transmission 5, and the second motor/generator 6 are disposed concentrically.

Meanwhile, the countershaft 72 is provided in the interior of the transaxle case 11 in parallel with the input shaft 2. A counter driven gear 73 and a final drive pinion gear 74 are formed on the countershaft 72. In addition, the counter drive gear 71 and the counter driven gear 73 mutually engage.

Figure 2:
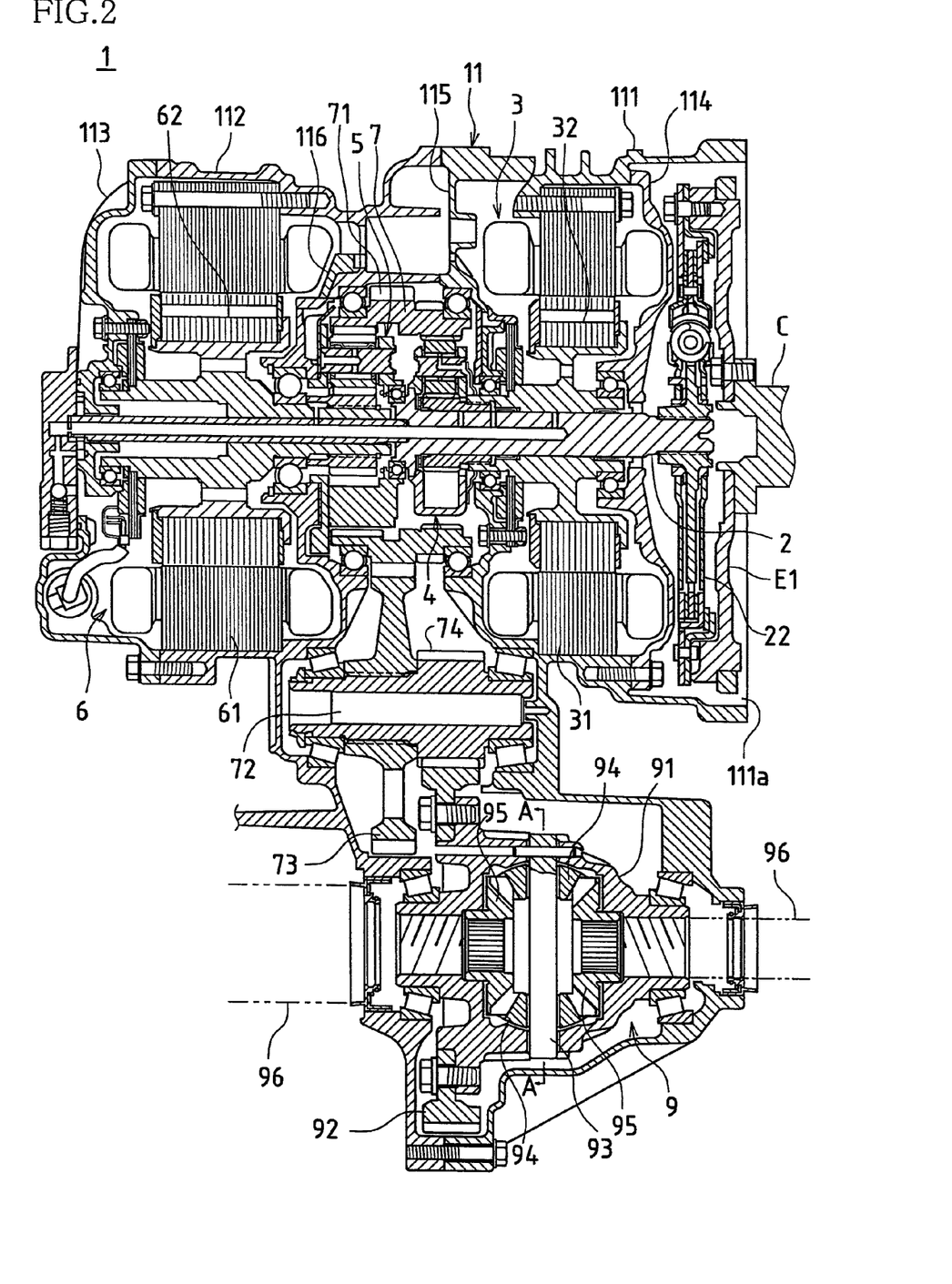
FIG. 2 is a cross-sectional view showing an internal configuration of a transaxle also of a hybrid vehicle.

Furthermore, as shown in FIG. 2, a differential device 9 is housed in an interior section of the transaxle case 11, and this differential device 9 includes a final ring gear 92 formed on an outer periphery side of a differential case 91, a pair of pinion gears 94 connected to the differential case 91 via a pinion shaft 93, a pair of side gears 95 engaged with each of the pinion gears 94, and two front driveshafts 96 each connected to one of the side gears 95 as an output shaft. A front wheel W is connected to each of the front driveshafts 96.

It should be noted that, although not specifically shown in the figure, an electronic control unit controlling the entire vehicle is provided with a microcomputer mainly including an arithmetic processing unit (i.e., a CPU or MPU) and a memory device (i.e., RAM or ROM) in addition to an input/output interface. Signals from an ignition switch, signals from an engine speed sensor, signals from a brake switch, signals from a vehicle speed sensor, signals from an accelerator opening-ratio sensor, signals from a shift position sensor, and signals from resolvers detecting rotation speeds of each of the first motor/generator 3 and the second motor/generator 6, etc. are input into this electronic control unit. In response thereto, signals controlling an intake air volume, a fuel injection volume, and an ignition timing of the engine E, signals controlling an output of the first motor/generator 3 and the second motor/generator 6, and control signals for an actuator (not shown) engaging and disengaging the clutch 22, etc. are output from the electronic control unit.

In a hybrid vehicle configured in this way, a torque required to be transferred to the front wheels W is calculated based on conditions such as vehicle speed and accelerator opening ratio, and the engine E, the clutch 22, the first motor/generator 3, and the second motor/generator 6 are controlled based on the results of this calculation.

In the event that torque output by the engine E is to be transferred to the front wheels W, the clutch 22 is engaged. As a result, the motive energy (torque) of the crankshaft C is transferred to the carrier 45 via the input shaft 2.

The torque transferred to the carrier 45 is transferred to the front wheels W via the ring gear 43, the annular member 7, the counter drive gear 71, the counter driven gear 73, the counter shaft 72, the final drive pinion gear 74, and the differential device 9, and drive force is generated. In addition, upon transference of the torque of the engine E to the carrier 45, the first motor/generator 3 functions as a generator, and generated electrical power can be stored in an electrical storage device (not shown).

Furthermore, the second motor/generator 6 is driven as a motor, and the motive energy thereof can be transferred to the power split mechanism 4. When the motive energy of the second motor/generator 6 is transferred to the sun gear 52 of the transmission 5 via the hollow shaft 26, the carrier 55 acts as a reaction-force element, and in addition, the rotation speed of the sun gear 52 is reduced, and motive energy rotating the ring gear 53 in a direction opposite to the rotation direction of the sun gear 52 is transferred. In this way, the motive energy of the engine E and the motive energy of the second motor/generator 6 are input to the power split mechanism 4 and combined, and the combined motive energy is transferred to the wheel W.

With the configuration of this embodiment, by reducing the rotation speed of the second motor/generator 6, the torque thereof can be increased and transferred to the power split mechanism 4. Accordingly, there is no need for a large design to be employed with respect to the physical structure of the second motor/generator 6 itself or the ratings thereof (specifically, the size of the second motor/generator 6 in a radial direction of the hollow shaft 26, the length of the second motor/generator 6 in the axial direction of the hollow shaft 26, etc.) in order to provide for situations where a requirement to increase the output of the second motor/generator 6 arises, and the second motor/generator 6 can be provided with a compact, lightweight design.

Figure 3:
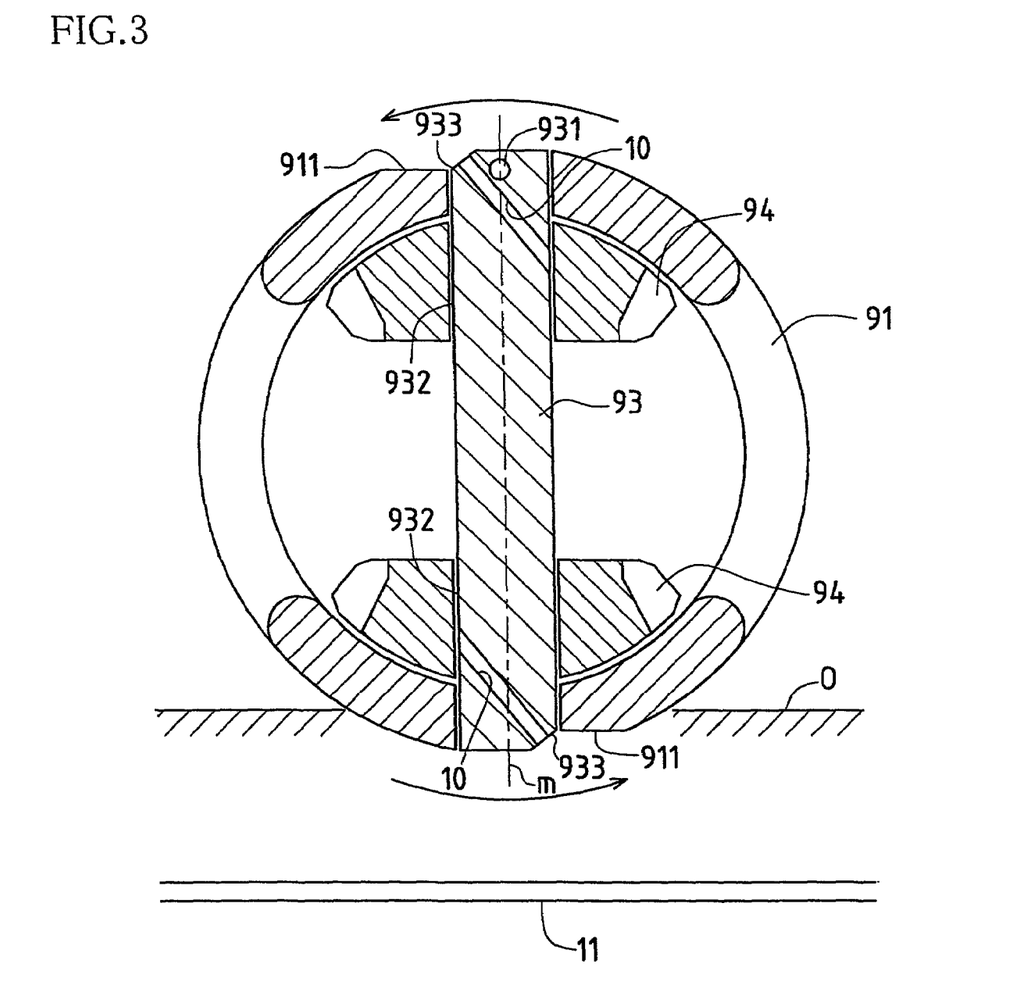
FIG. 3 is a cross sectional view also of a differential device along line A-A of FIG. 2.

Furthermore, as shown in FIG. 3, the pinion shaft 93 of the differential device 9 is secured at an end section thereof in a direction of an axis m to the differential case 91 by a pin 931. Each pinion gear 94 is supported so as to be capable of freely sliding on the pinion shaft 93 about the axis m thereof. A lubricating oil channel 10 inclined at a specific angle (for example, 40°) with respect to the axis m is provided in each of the end sections of the pinion shaft 93 in the direction of the axis m, and each lubricating oil channel 10 passes through the pinion shaft 93 in a straight line. The one end of each of the lubricating oil channels 10 opens to the exterior of the differential case 91 at a shaft-end corner section of the pinion shaft 93 corresponding to an upstream side thereof in the direction of rotation of the differential case 91, and the other end thereof opens to a sliding surface 932 of the pinion shaft 93 with respect to one of the pinion gears 94. A lower section of the differential case 91 is immersed in lubricating oil O held within a bottom section of the transaxle case 11, and upon rotation of the differential case 91, lubricating oil O from the bottom section of the transaxle case 11 is introduced via the one end of the lubricating oil channel 10 at each end section of the pinion shaft 93 and is provided to the sliding surfaces 932 of the pinion shaft 93 with respect to the pinion gears 94 via the other end thereof. It should be noted that arrows shown in FIG. 3 indicates the direction of rotation of the differential case 91.

Furthermore, cut-away sections 911, 933 formed in order to expose the one end of each of the lubricating oil channels 10 so as to face upstream in the direction of rotation of the differential case 91, are provided at portions of the differential case 91 further upstream in the direction of rotation thereof than the pinion shaft 93 and at the shaft-end corner sections of the pinion shaft 93 corresponding to the rotation-direction upstream side positions of the differential case 91. In order that the lubricating oil O can be easily introduced via the one end of the lubricating oil channels 10 in line with rotation of the differential case 91, the cut-away sections 911 provided at portions of the differential case 91 further upstream in the direction of rotation thereof than the pinion shaft 93 are cut away so as to form a surface substantially perpendicular to the axis m of the pinion shaft 93. Meanwhile, in order that the lubricating oil O can be easily introduced via the one end of the lubricating oil channels 10 in line with rotation of the differential case 91, each cut-away section 933 provided at a shaft-end corner section of the pinion shaft 93 is formed by chamfering so as to form a surface substantially perpendicular to the lubricating oil channel 10. Furthermore, the cut-away sections 911 provided at portions of the differential case 91 further upstream in the direction of rotation thereof than the pinion shaft 93 and the cut-away sections 933 provided at the shaft-end corner sections of the pinion shaft 93 are continuously formed each other without a difference in level. In this case, the one end of each of the lubricating oil channels 10 and each of the cut-away sections 911, 933 are immersed in the lubricating oil O when disposed at the bottom section of the transaxle case 11 in line with rotation of the differential case 91.

Accordingly, in the above-explained first embodiment, upon rotation of the differential case 91, having a lower section thereof immersed in the lubricating oil O held within a bottom section of the transaxle case 11, lubricating oil O is scooped up by the end of each of the lubricating oil channels 10 opening to the exterior of the differential case 91 at the shaft-end corner sections of the pinion shaft 93 corresponding to the rotation-direction upstream side of the differential case 91 and introduced into the end of the lubricating oil channels 10, and is provided to the sliding surfaces 932 of the pinion shaft 93 with respect to the pinion gears 94 via the other ends of the lubricating oil channels 10 opening to the sliding surfaces 932 with respect to the pinion gears 94. As a result of this, even though the sliding surfaces 932 of the pinion shaft 93 with respect to each of the pinion gears 94 are disposed inside the rotating differential case 91, lubricating oil is smoothly provided to the sliding surfaces 932 of the pinion shaft 93 with respect to each of the pinion gears 94 via the lubricating oil channels 10. Therefore, even when a large rotation difference occurs between the left and right drive wheels W, the sliding surfaces 932 of the pinion shaft 93 with respect to the pinion gears 94 are sufficiently lubricated by the lubricating oil O provided to the sliding surfaces 932 of the pinion shaft 93, and as a result, wearing of the sliding surfaces 932 of the pinion shaft 93 can be effectively prevented.

In addition, simply by providing lubricating oil channels 10 passing through the interior of each of the end sections of the pinion shaft 93 in the direction of the axis m thereof, lubricating oil O scooped up by the one end of each of the lubricating oil channels 10 upon rotation of the differential case 91 is smoothly provided to the sliding surfaces 932 of the pinion shaft 93 with respect to the pinion gears 94, and therefore, in contrast to a configuration wherein a strong sealing construction is required upon the guiding of lubricating oil from a transaxle case to a hollow channel in the driveshaft, the construction for provision of lubricating oil O to the sliding surfaces 932 of the pinion shaft 93 does not become complicated, and an extremely simple provision construction can be realized.

Furthermore, as cut-away sections 911, 933 are provided at portions of the differential case 91 further upstream in the direction of rotation thereof than the pinion shaft 93 and at the shaft-end corner sections of the pinion shaft 93 corresponding to the rotation-direction upstream side positions of the differential case 91, respectively, in order to expose the one end of each of the lubricating oil channels 10 so as to face upstream in the direction of rotation of the differential case 91, when an end side of each of the lubricating oil channels 10 moves down into the lubricating oil O held within the bottom section of the transaxle case 11 upon rotation of the differential case 91, the lubricating oil O can be guided smoothly and without impediment from the direction of rotation of the differential case 91 and easily introduced via the end of the lubricating oil channels 10. Accordingly, the introduction of the lubricating oil O into each of the lubricating oil channels 10 can be performed more smoothly due to the action of the cut-away sections 911, 933, and this configuration is extremely beneficial in terms of the provision of the lubricating oil O from the other end of each of the lubricating oil channels 10 to the sliding surfaces 932 of the pinion shaft 93 with respect to the pinion gears 94.

Second Embodiment

Figure 4:
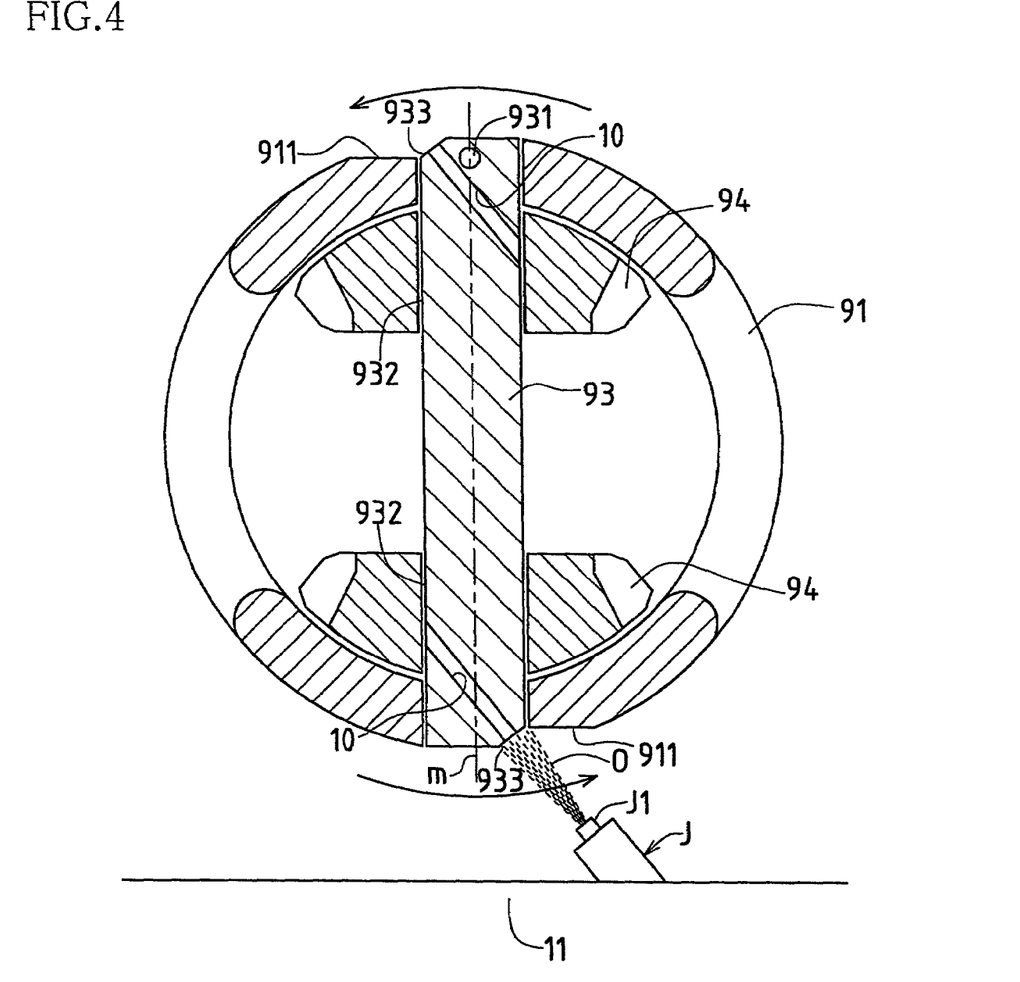
FIG. 4 is a view of a differential device according to a second embodiment of the present invention and equivalent to FIG. 3.

The following is a description of a second embodiment of the present invention, with reference to FIG. 4.

The second embodiment relates to a differential device configured so as to provide lubricating oil to a sliding surface of a pinion shaft with respect to a pinion gear in a situation wherein a lower section of a differential case is not immersed in lubricating oil at a bottom section of a transaxle case. It should be noted that, with the exception of the fact that the lower section of the differential case is not immersed in lubricating oil at the bottom section of the transaxle case, the configuration of the second embodiment is identical to that of the above-explained first embodiment, and therefore, the same reference symbols are used and a detailed explanation thereof is omitted.

That is to say, as shown in FIG. 4, an oil jet J spraying lubricating oil O towards an end of each of the lubricating oil channels 10 upon rotation of the differential case 91 is provided as a lubricating-oil spraying means at the bottom section of the transaxle case 11 in this embodiment. In order that the lubricating oil O sprayed vigorously towards the end of one of the lubricating oil channels 10 disposed in the lower position when the axis m of the pinion shaft 93 becomes oriented vertically due to rotation of the differential case 91 can be easily introduced into the lubricating oil channel 10, the oil jet J is provided with a nozzle hole J1 oriented in a direction of the oil channel of the lubricating oil channel 10. Furthermore, the configuration of the second embodiment is such that the lubricating oil O sprayed by the oil jet J is introduced into the one end of the lubricating oil channels 10 and provided to the sliding surfaces 932 of the pinion shaft 93 with respect to the pinion gears 94 via the other end thereof.

Therefore, in the second embodiment, lubricating oil O from the nozzle hole J1 of the oil jet J provided at the bottom section of the transaxle case 11 is sprayed vigorously towards the end of one of the lubricating oil channels 10 disposed in the lower position when the axis m of the pinion shaft 93 becomes oriented vertically due to rotation of the differential case 91, and the sprayed lubricating oil O is introduced into the one end of the lubricating oil channels 10 and provided to the sliding surfaces 932 of the pinion shaft 93 with respect to the pinion gears 94 via the other end thereof. As a result of this, even though the sliding surfaces 932 of the pinion shaft 93 with respect to each of the pinion gears 94 are disposed inside the rotating differential case 91, lubricating oil O is smoothly provided to the sliding surfaces 932 of the pinion shaft 93 with respect to the pinion gears 94 via the lubricating oil channels 10. Therefore, even when a large rotation difference occurs between the left and right drive wheels W, the sliding surfaces 932 of the pinion shaft 93 with respect to each of the pinion gears 94 are sufficiently lubricated by the lubricating oil O provided to the sliding surfaces 932 of the pinion shaft 93, and as a result, wearing of the sliding surfaces 932 of the pinion shaft 93 can be effectively prevented.

In addition, by simply providing the oil jet J in addition to providing lubricating oil channels 10 passing through the interior of each of the end sections of the pinion shaft 93 in the direction of the axis m thereof, the sliding surfaces 932 of the pinion shaft 93 can be sufficiently lubricated, and therefore, in contrast to a configuration wherein a strong sealing construction is required upon the guiding of lubricating oil from a transaxle case to a hollow channel in the driveshaft, the construction for provision of lubricating oil O to the sliding surfaces 932 of the pinion shaft 93 does not become complicated, and an extremely simple provision construction can be realized.

Furthermore, the lubricating oil O sprayed by the nozzle hole J1 of the oil jet J can be guided without impediment from a wide area and easily introduced via the one end of the lubricating oil channel 10 by the cut-away sections 911, 933 provided at portions of the differential case 91 further upstream in the direction of rotation thereof than the pinion shaft 93 and at the shaft-end corner sections of the pinion shaft 93 corresponding to the rotation-direction upstream side positions of the differential case 91 in order to expose one end of each of the lubricating oil channels 10 so as to face upstream in the direction of rotation of the differential case 91. Accordingly, the introduction of the lubricating oil O into each of the lubricating oil channels 10 can be performed more smoothly due to the action of the cut-away sections 911, 933, and this configuration is extremely beneficial in terms of the provision of the lubricating oil O from the other end of each of the lubricating oil channels 10 to the sliding surfaces 932 of the pinion shaft 93 with respect to the pinion gears 94.

Furthermore, even though the lower section of the differential case 91 is not immersed in lubricating oil O held within a bottom section of the transaxle case 11, the lubricating oil O sprayed by the nozzle hole J1 of the oil jet J can be sufficiently provided to the sliding surfaces 932 of the pinion shaft 93 with respect to the pinion gears 94 by passing from the one end of the lubricating oil channels 10 to the other end thereof, and therefore, the second embodiment of the present invention can be applied in any kind of differential device as a construction for provision of lubricating oil O to the sliding surfaces 932 of the pinion shaft 93, and the versatility of the provision construction for lubricating oil can be enhanced.

It should be noted that the present invention is not limited to the above-explained embodiments and that all other variations thereof are also covered. For example, although each of the lubricating oil channels 10 is provided at both end sections of the pinion shaft 93 in the direction of the axis m thereof and at a specific angle (for example, 40°) with respect to the axis m in the above-explained embodiments, the angle of inclination of each of the lubricating oil channels 10 with respect to the axis m of the pinion shaft 93 is not limited to 40°, and as long as the lubricating oil can be provided against a centrifugal force generated upon rotation of the transaxle case to the sliding surfaces with respect to the pinion gears via each of the lubricating oil channels, the lubricating oil channels may be inclined at any angle with respect to the axis of the pinion shaft.

Furthermore, although each of the lubricating oil channels 10 passes through each of the end sections of the pinion shaft 93 in the direction of the axis m thereof in a straight line in the above-explained embodiments, as long as the lubricating oil can be provided to the sliding surfaces with respect to the pinion gears via the lubricating oil channels, the lubricating oil channels may be curved or divided into a plurality of branches.

It should be noted that without departure from the intention, gist, and principal characteristics thereof, the present invention can have many other embodiments. Accordingly, the above-described embodiments are no more than simple examples and should not be interpreted in a limited manner. The scope of the present invention is set forth by the scope of the claims, and is not limited to the description of the specification in any way. Furthermore, all modifications and changes within a scope equivalent to that of the claims are within the scope of the present invention.

What is claimed is:

1. A differential device provided with a pair of side gears and a pair of pinion gears housed inside a differential case,
    wherein the pinion gears are supported by a pinion shaft fixed to the differential case at end sections thereof in an axial direction so as to be capable of sliding freely about the pinion shaft;
    lubricating oil channels are provided in the pinion shaft passing through an interior of each of the end sections thereof in the axial direction, one end of each of the lubricating oil channels opening to an exterior of the differential case at a shaft-end corner section of the pinion shaft corresponding to an upstream side in a direction of rotation of the differential case, and another end thereof opening to a sliding surface of the pinion shaft with respect to one of the pinion gears; and
    a lubricating oil provision mechanism providing lubricating oil to the lubricating oil channels upon rotation of the differential case is provided.

2. The differential device of claim 1, wherein the lubricating oil provision mechanism is configured such that lubricating oil is held within a bottom section of a casing housing the differential case, a lower section of the differential case is immersed in the lubricating oil, and upon rotation of the differential case, the lubricating oil at the bottom section of the casing is scooped up by the one end of each of the lubricating oil channels and introduced into the lubricating oil channels.

3. A differential device provided with a pair of side gears and a pair of pinion gears housed inside a differential case,
    wherein the pinion gears are supported by a pinion shaft fixed to the differential case at end sections thereof in an axial direction so as to be capable of sliding freely about the pinion shaft;
    lubricating oil channels are provided in the pinion shaft passing through an interior of each of the end sections thereof in the axial direction, one end of each of the lubricating oil channels opening to an exterior of the differential case at a shaft-end corner section of the pinion shaft corresponding to an upstream side in a direction of rotation of the differential case, and another end thereof opening to a sliding surface of the pinion shaft with respect to one of the pinion gears;
    a lubricating oil provision mechanism providing lubricating oil to the lubricating oil channels upon rotation of the differential case is provided; and
    wherein the lubricating oil provision mechanism is configured at a bottom section of the casing housing the differential case as a lubricating oil spraying means spraying lubricating oil towards the one end of each of the lubricating oil channels upon rotation of the differential case, and the lubricating oil sprayed by the lubricating oil spraying means is introduced into each of the lubricating oil channels via the one end thereof.

4. A differential device provided with a pair of side gears and a pair of pinion gears housed inside a differential case,
    wherein the pinion gears are supported by a pinion shaft fixed to the differential case at end sections thereof in an axial direction so as to be capable of sliding freely about the pinion shaft;
    lubricating oil channels are provided in the pinion shaft passing through an interior of each of the end sections thereof in the axial direction, one end of each of the lubricating oil channels opening to an exterior of the differential case at a shaft-end corner section of the pinion shaft corresponding to an upstream side in a direction of rotation of the differential case, and another end thereof opening to a sliding surface of the pinion shaft with respect to one of the pinion gears;
    a lubricating oil provision mechanism providing lubricating oil to the lubricating oil channels upon rotation of the differential case is provided; and
    wherein cut-away sections are provided at portions of the differential case further upstream in the direction of rotation thereof than the pinion shaft and at the shaft-end corner sections of the pinion shaft corresponding to the rotation-direction upstream-side positions of the differential case in order to expose the one end of each of the lubricating oil channels so as to face upstream in the direction of rotation of the differential case.

5. A differential device provided with a pair of side gears and a pair of pinion gears housed inside a differential case, wherein the pinion gears are supported by a pinion shaft fixed to the differential case at end sections thereof in an axial direction so as to be capable of sliding freely about the pinion shaft;

lubricating oil channels are provided in the pinion shaft passing through an interior of each of the end sections thereof in the axial direction, one end of each of the lubricating oil channels opening to an exterior of the differential case at a shaft-end corner section of the pinion shaft corresponding to an upstream side in a direction of rotation of the differential case, and another end thereof opening to a sliding surface of the pinion shaft with respect to one of the pinion gears; and a lubricating oil provision mechanism providing lubricating oil to the lubricating oil channels upon rotation of the differential case is provided;

wherein the lubricating oil provision mechanism is configured such that lubricating oil is held within a bottom section of a casing housing the differential case, a lower section of the differential case is immersed in the lubricating oil, and upon rotation of the differential case, the lubricating oil at the bottom section of the casing is scooped up by the one end of each of the lubricating oil channels and introduced into the lubricating oil channels, and wherein cut-away sections are provided at portions of the differential case further upstream in the direction of rotation thereof than the pinion shaft and at the shaft-end corner sections of the pinion shaft corresponding to the rotation-direction upstream-side positions of the differential case in order to expose the one end of each of the lubricating oil channels so as to face upstream in the direction of rotation of the differential case.

6. The differential device of claim 3, wherein cut-away sections are provided at portions of the differential case further upstream in the direction of rotation thereof than the pinion shaft and at the shaft-end corner sections of the pinion shaft corresponding to the rotation-direction upstream-side positions of the differential case in order to expose the one end of each of the lubricating oil channels so as to face upstream in the direction of rotation of the differential case.

* * * * *